United States Patent
Kim et al.

(10) Patent No.: US 12,107,871 B2
(45) Date of Patent: Oct. 1, 2024

(54) APPARATUS FOR SECURITY OF VEHICLE CAN COMMUNICATION AND METHOD THEREOF

(71) Applicant: Korea Automotive Technology Institute, Cheonan-si (KR)

(72) Inventors: Yong En Kim, Cheonan-si (KR); Young Wook Son, Cheonan-si (KR); Chul Soo Kim, Cheonan-si (KR); Jong Phil Won, Cheonan-si (KR); Ho Seong Lee, Cheonan-si (KR); Taek Kyu Lim, Cheonan-si (KR); Ji Min Kim, Cheonan-si (KR)

(73) Assignee: Korea Automotive Technology Institute, Cheonan-si (KR)

( * ) Notice: Subject to any disclaimer, the term of this patent is extended or adjusted under 35 U.S.C. 154(b) by 347 days.

(21) Appl. No.: 17/486,284

(22) Filed: Sep. 27, 2021

(65) Prior Publication Data
US 2022/0159018 A1    May 19, 2022

(30) Foreign Application Priority Data

Nov. 18, 2020  (KR) .......................... 10-2020-0154744

(51) Int. Cl.
*H04L 9/40*       (2022.01)
*H04L 12/40*      (2006.01)

(52) U.S. Cl.
CPC .......... *H04L 63/1416* (2013.01); *H04L 12/40* (2013.01); *H04L 63/1441* (2013.01); *H04L 2012/40215* (2013.01); *H04L 2012/40273* (2013.01)

(58) Field of Classification Search
CPC . H04L 63/1416; H04L 12/40; H04L 63/1441; H04L 2012/40215; H04L 2012/40273
See application file for complete search history.

(56) References Cited

U.S. PATENT DOCUMENTS

| | | | |
|---|---|---|---|
| 11,209,891 B2 * | 12/2021 | Kulandaivel | H04L 12/40032 |
| 2010/0306457 A1 * | 12/2010 | Wilson | H04L 49/901 |
| | | | 711/E12.007 |
| 2018/0352512 A1 * | 12/2018 | Kim | H04L 67/12 |
| 2019/0173912 A1 * | 6/2019 | Ujiie | H04L 12/40 |
| 2019/0379682 A1 * | 12/2019 | Overby | H04L 9/002 |
| 2022/0046114 A1 * | 2/2022 | Entelis | H04L 12/40 |
| 2022/0182404 A1 * | 6/2022 | Kishikawa | H04L 63/1416 |
| 2022/0224777 A1 * | 7/2022 | Entelis | H04L 69/04 |

FOREIGN PATENT DOCUMENTS

| KR | 10-1952117 B1 | 2/2019 |
|---|---|---|
| KR | 10-2081690 B1 | 2/2020 |

* cited by examiner

Primary Examiner — Kristie D Shingles
(74) Attorney, Agent, or Firm — Sughrue Mion, PLLC

(57) ABSTRACT

Provided is an apparatus for security of vehicle CAN communication including a security module unit included in each node of a vehicle CAN communication network and configured to monitor an identifier (ID) of each CAN message received through a CAN transceiver to determine whether the CAN message is a malicious CAN message to perform error processing, and a control unit configured to set an ID to be monitored by the security module unit and control the security module unit not to perform monitoring on the ID when the node transmits the CAN message.

15 Claims, 8 Drawing Sheets

FIG. 2A

| SOF | 11-bit Identifier | RTR | IDE | R0 | DLC | 0…8 Bytes Data | CRC | ACK | EOF | IFS |

FIG. 2B

| CAN 2.0A (11 Bit Identifier) | | |
|---|---|---|
| Bits | | Description |
| 1 | SOF | Start of Frame |
| 11 | ID | Identifier |
| 1 | RTR | Remote Transmission Request |
| 1 | R1 | Reserved Bits |
| 1 | R0 | Reserved Bits |
| 4 | DLC | Data Length Code |
| 0 - 64 | Data | Data Bytes |
| 16 | CRC | Error Identification Code |
| 2 | ACK | Acknowledge |
| 7 | EOF | End of Frame |
| 7 | IFS | Inter-frame space |

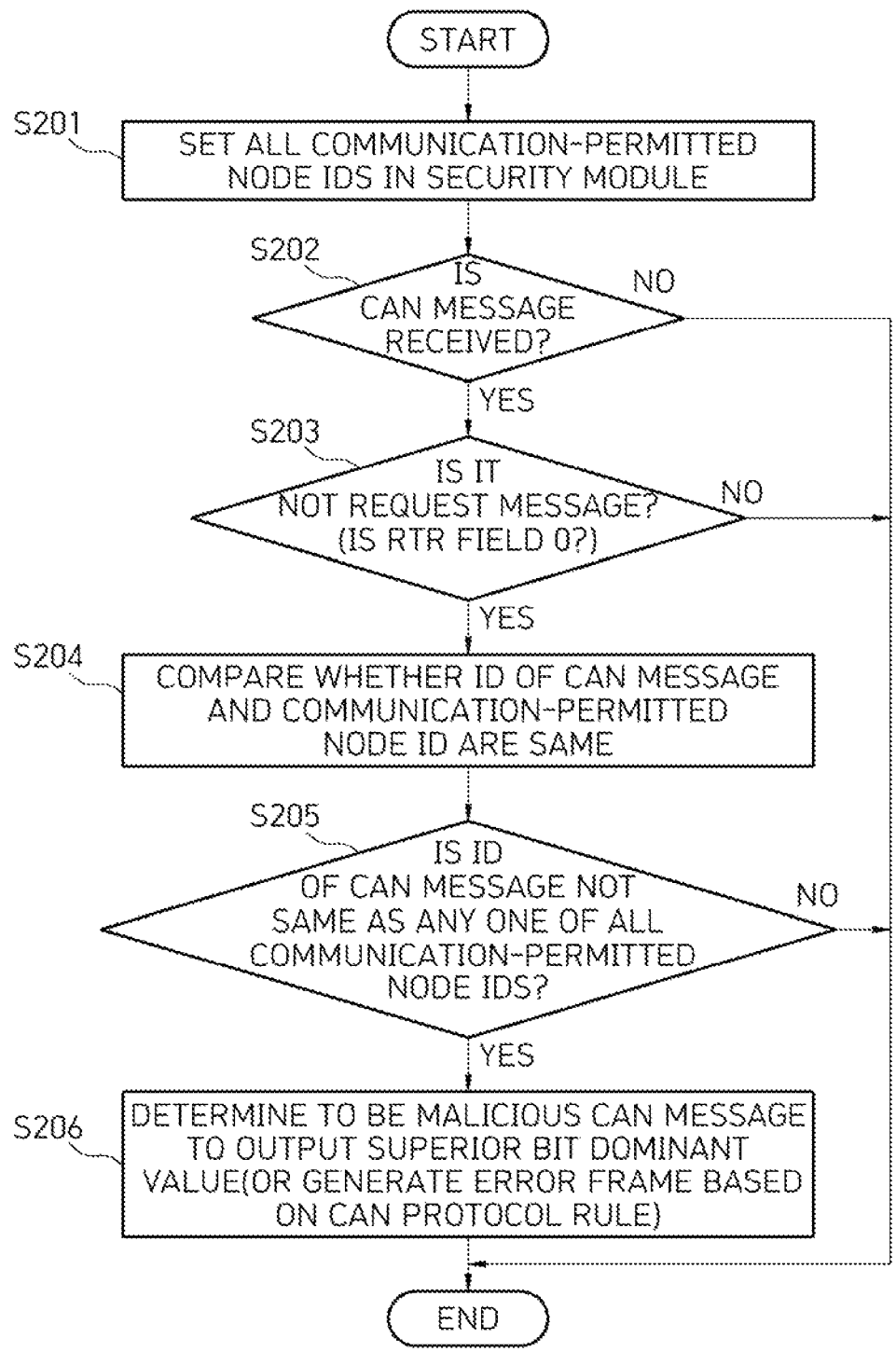

APPARATUS FOR SECURITY OF VEHICLE CAN COMMUNICATION AND METHOD THEREOF

CROSS-REFERENCE TO RELATED APPLICATION

This application claims priority to and the benefit of Korean Patent Application No. 10-2020-0154744, filed on Nov. 18, 2020, the disclosure of which is incorporated herein by reference in its entirety.

BACKGROUND

1. Field of the Invention

The present invention relates to an apparatus for security of vehicle controller area network (CAN) communication and a method thereof, and more particularly, to an apparatus for security of vehicle CAN communication and a method thereof capable of determining that a malicious CAN message is being received when an identifier (ID) of a node is included in the CAN message received from a vehicle CAN node to perform error processing on a CAN message in real time.

2. Discussion of Related Art

In general, as a vehicle system is automated, communication between in-vehicle controllers is also frequently performed, and controller area network (CAN) communication is generally used for in-vehicle communication.

That is, an electronic control system inside a vehicle includes dozens of electronic control units (ECUs) such as an engine controller, a transmission controller, a brake controller, and an airbag controller. The CAN communication is used for communication between the plurality of electronic control devices (for example, ECU 1 to ECU 5).

In general, since the CAN communication has an arbitration function, the CAN communication uses two twisted wires to enable communication by connecting a plurality of ECUs in parallel. Basically, according to the message communication of the CAN protocol method, the network includes a plurality of nodes (for example, a CAN controller included in each ECU) and a common CAN bus, and each node transmits a message in a broadcasting manner, and each node selects and receives the required message. That is, all of the CAN controllers (or nodes) transmit and receive messages using the CAN bus (BUS) in common.

In addition, each CAN controller (or node) transmits messages to be transmitted to all nodes (for example, a CAN controller included in each of the plurality of ECUs) on the network in a broadcast manner.

The CAN controller provides a self-arbitration function using a message identifier.

In detail, each CAN controller (or node) recognizes an identifier (ID) of a message and filters and receives only necessary messages from among broadcast messages.

For reference, there is an advantage in that the CAN communication method has a high security advantage by applying a plurality of error detection methods (for example, bit error, stuff error, cyclic redundancy check (CRC) error, form error, and acknowledgment error).

Background art of the present invention is disclosed in Korean Patent Laid-Open Publication No. 10-2017-0030514 (published on Mar. 22, 2019, Apparatus and Method for Blocking Vehicle Network Attack Signal).

The background art is to block an attack signal input to the vehicle network when the CAN ID of an external signal input from an external device to the vehicle network is included in a preset transmission prohibition list to prevent forced control operation of a vehicle.

However, since the background art describes a method of receiving an entire frame of a CAN message and then determining whether to perform an ID check to block the ID, the method is slow to cope with an attack. Therefore, there is a need for a technology that can quickly determine whether an attack (or malicious CAN message) is present before receiving the entire frame of the CAN message and cope with the attack.

SUMMARY OF THE INVENTION

According to one aspect of the present invention, the present invention is directed to an apparatus for security of vehicle controller area network (CAN) communication and a method thereof capable of determining that a malicious CAN message is being received when an identifier (ID) of a node is included in the CAN message received from a vehicle CAN node to perform error processing on a CAN message in real time.

According to another aspect of the present invention, the present invention is directed to an apparatus for security of vehicle controller area network (CAN) communication and a method thereof capable of determining that a malicious CAN message is being received when an identifier (ID) of the CAN message received from a node of a vehicle CAN is not a pre-registered communication-permitted ID to perform error processing on a CAN message in real time.

According to an aspect of the present invention, an apparatus for security of vehicle CAN communication including a security module unit included in each node of a vehicle CAN communication network and configured to monitor an identifier (ID) of each CAN message received through a CAN transceiver to determine whether the CAN message is a malicious CAN message to perform error processing, and a control unit configured to set an ID to be monitored by the security module unit and control the security module unit not to perform monitoring on the ID when the node transmits the CAN message.

When a remote transmission request (RTR) field of the CAN message received through the CAN transceiver is 0 and the CAN message includes the same ID as an ID of the node itself, the security module unit may determine that the CAN message is the malicious CAN message and perform error processing on the CAN message.

The security module unit may be implemented in a form of an application specific integrated circuit (ASIC).

When it is determined that the received CAN message is the malicious CAN message, the security module unit may input superior data of 0 to a transmitting (TX) terminal of the CAN transceiver and perform error processing in such a way that signals CAN H and CAN L output to a bus of the CAN transceiver are output with a superior bit dominant value.

When it is determined that the received CAN message is the malicious CAN message, the security module unit does not transmit superior data of 0 to an end of frame (EOF) of data but rather transmits an error frame according to a CAN communication rule.

The control unit may disable the security module unit when the node itself uses an enable signal (EN) to transmit the CAN message and enable the security module unit to operate only when the node itself receives the CAN message.

The control unit may select one of ID registers, in which an ID of the security module unit is stored, through an internal multiplexer (MUX) unit using an ID_SEL signal, and set the ID in any one of the selected ID registers using an ID_SET signal.

When the CAN message is received through the CAN transceiver, the control unit may store data having a plurality of fields designated in the CAN message in an input register of a register unit of the security module unit, and a comparison unit may compare the ID of the CAN message stored in the input register and each ID set in an ID register of the security module unit to determine that the received CAN message is the malicious CAN message when the ID stored in the input register is the same as the ID set in the ID register.

The plurality of designated fields may be a start of frame (SOF) field, an identifier (ID) field, and a remote transmission request (RTR) field.

The security module unit may include a first OR gate configured to output an output value for the same ID detection result according to a comparison result of the comparison unit, a D flip-flop configured to receive a clock when it is determined whether the designated field of the CAN message is a last field, an inversion selection unit configured to invert an output signal of the D flip-flop to process a message determined to be the malicious CAN message as an error, and a second OR gate configured to output an output of the inversion selection unit as a signal corresponding to whether the malicious CAN message is received.

The apparatus for security of vehicle controller area network (CAN) communication may further include a permitted ID monitoring unit configured to monitor the nodes of the vehicle CAN communication network so that only the CAN message of the communication-permitted ID may be received through a CAN bus.

The permitted ID monitoring unit may include a security module unit configured to store a plurality of communication-permitted IDs, and compare the ID of each CAN messages received through the CAN transceiver with the plurality of IDs to determine that the CAN message with a communication-non-permitted ID is the malicious CAN message and perform the error processing, and a control unit configured to set the plurality of communication-permitted IDs to be monitored by the security module unit.

According to another aspect of the present invention, a method of security of vehicle CAN communication includes setting an ID to be monitored in a security module unit by a control unit included in each node of a vehicle CAN communication network, monitoring, by the security module unit, an ID of each CAN message received through a CAN transceiver, determining, by the security module unit, whether the received CAN message is a malicious CAN message through the ID monitoring, and when the received CAN message is the malicious CAN message, performing, by the security module unit, error processing on the received CAN message in real time.

When the node itself intends to transmit the CAN message, the method of security of vehicle CAN communication may control, by the control unit, not to perform ID monitoring in the security module unit.

In the determining of whether the received CAN message is the malicious CAN message, when a remote transmission request (RTR) field of the CAN message received through the CAN transceiver is 0 and the same ID as the ID of the node itself is included in the CAN message, the security module unit may determine that the received CAN message is the malicious CAN message.

In the performing, by the security module unit, of the error processing in real time, when it is determined that the received CAN message is the malicious CAN message, the security module unit may input superior data of 0 to a transmitting (TX) terminal of the CAN transceiver and perform the error processing in such a way that signals CAN H and CAN L output to a bus of the CAN transceiver are output with a superior bit dominant value.

The control unit may disable the security module unit when the node itself uses an enable signal EN to transmit the CAN message, and enable the security module unit to operate only when the node itself receives the CAN message.

In the setting, by the control unit, of the ID to be monitored in the security module unit, the control unit may select one of ID registers, in which an ID of the security module unit is stored, through an internal MUX unit using an ID_SEL signal, and set the ID in any one of the selected ID registers using an ID_SET signal.

The determining of whether the received CAN message is the malicious CAN message may include, when the CAN message is received through the CAN transceiver, storing, by the control unit, data having a plurality of fields designated in the CAN message in an input register of a register unit of the security module unit, comparing, by a comparison unit, an ID of the CAN message stored in the input register with an ID set in an ID register of the security module unit, and when the ID stored in the input register and the ID set in the ID register are the same, determining that the received CAN message is the malicious CAN message.

The plurality of designated fields may be a start of frame (SOF) field, an identifier (ID) field, and a remote transmission request (RTR) field.

The method of security of vehicle CAN communication may further include monitoring, by a permitted ID monitoring unit further included in nodes of the vehicle CAN communication network, the CAN message so that only a CAN message with a communication-permitted ID may be received through a CAN bus.

In order to monitor the CAN message so that only the CAN message with the communication-permitted ID may be received through the CAN bus, a plurality of communication-permitted IDs are stored in the security module unit of the permitted ID monitoring unit, and the security module unit compares IDs of CAN messages that are each received through the CAN transceiver with the plurality of IDs to determine the CAN message with a communication-non-permitted ID as a malicious CAN message and perform error processing on the CAN message, and the control unit sets the plurality of communication-permitted IDs to be monitored by the security module unit.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2A and FIG. 2B are exemplary diagrams illustrating a CAN message frame structure of a CAN 2.0A standard in a general CAN communication method;

FIG. 7 is a flowchart for describing a method of security of vehicle CAN communication according to a second embodiment of the present invention.

DETAILED DESCRIPTION OF EXEMPLARY EMBODIMENTS

Hereinafter, embodiments of an apparatus for security of vehicle CAN communication and a method thereof according to the present invention will be described with reference to the accompanying drawings.

In this process, thicknesses of lines, sizes of components, and the like, illustrated in the accompanying drawings may be exaggerated for clearness of explanation and convenience. In addition, terms to be described below are defined in consideration of functions in the present invention and may be construed in different ways by the intention of users or operators or practice. Therefore, these terms should be defined on the basis of the contents throughout the present specification.

Figure 1:
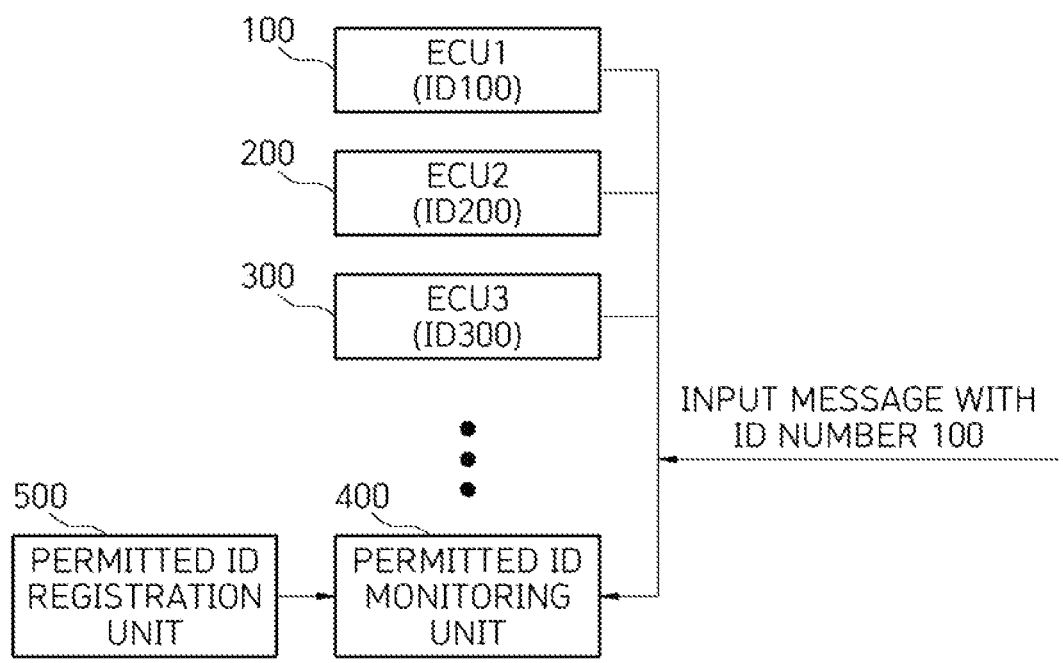
FIG. 1 is an exemplary diagram illustrating a vehicle controller area network (CAN) according to an embodiment of the present invention.

FIG. 1 is an exemplary diagram illustrating a vehicle controller area network (CAN) according to an embodiment of the present invention.

As illustrated in FIG. 1, all nodes (for example, electronic control units (ECU 1, ECU 2, ECU 3, etc.)) on the vehicle CAN network have a unique identifier (ID) to transmit/receive CAN messages.

In this case, in the present embodiment, the vehicle controller area network includes a permitted ID monitoring unit 400 that permits only reception of a CAN message with a communication-permitted node ID and a permitted ID registration unit 500 that registers the communication-permitted node ID in the permitted ID monitoring unit 400 in advance. That is, the communication-permitted ID stored in the permitted ID registration unit 500 is registered in the security module unit 130 of the permitted ID monitoring unit 400.

In addition, when each of the nodes (for example, ECU 1, ECU 2, ECU 3, and the like) includes the same ID as their own node ID in the received CAN message (for example, the CAN message in which the RTR field is 0), the node includes the security module unit 130 that determines the received CAN message as a malicious CAN message and blocks the received CAN message.

Figure 4:
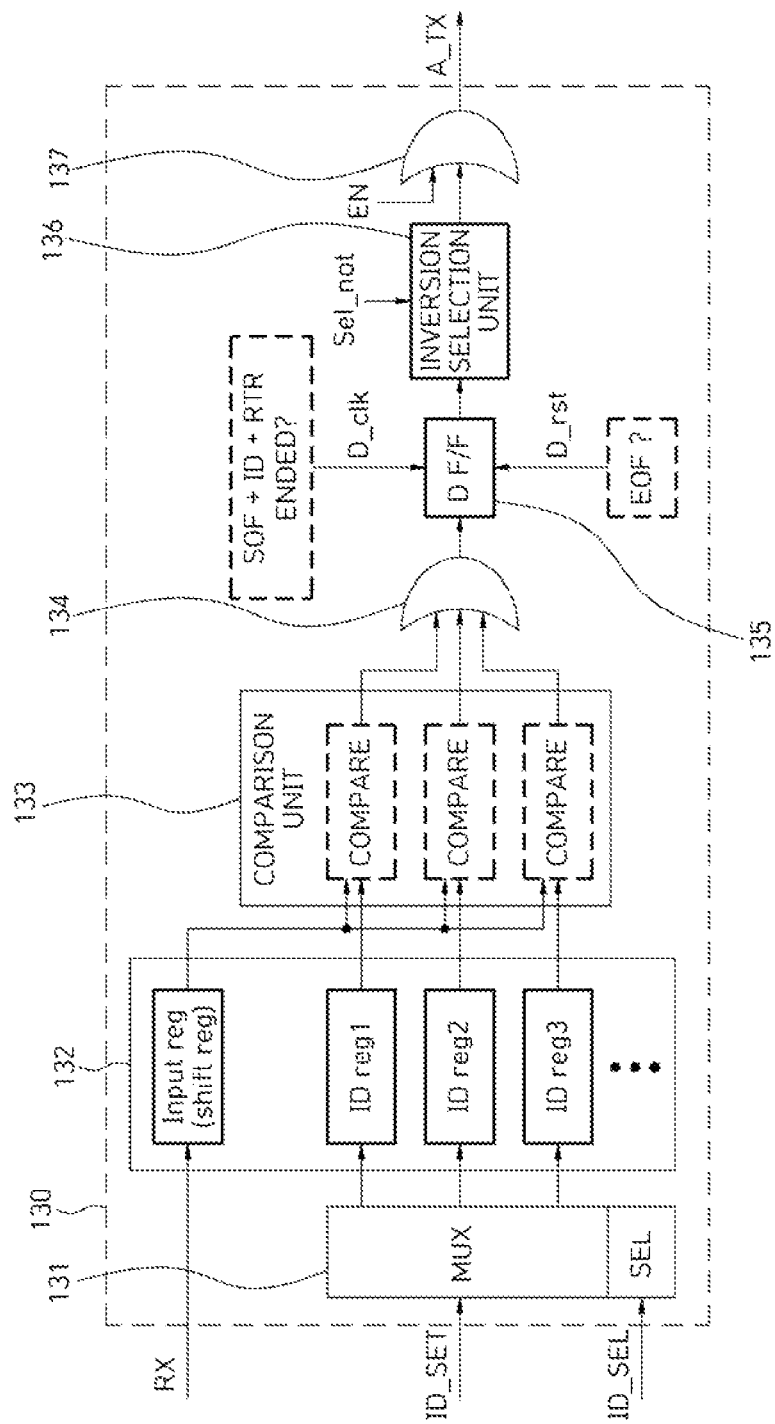
FIG. 4 is an exemplary diagram illustrating a more detailed configuration of a security module unit in FIG. 3.
Figure 5:
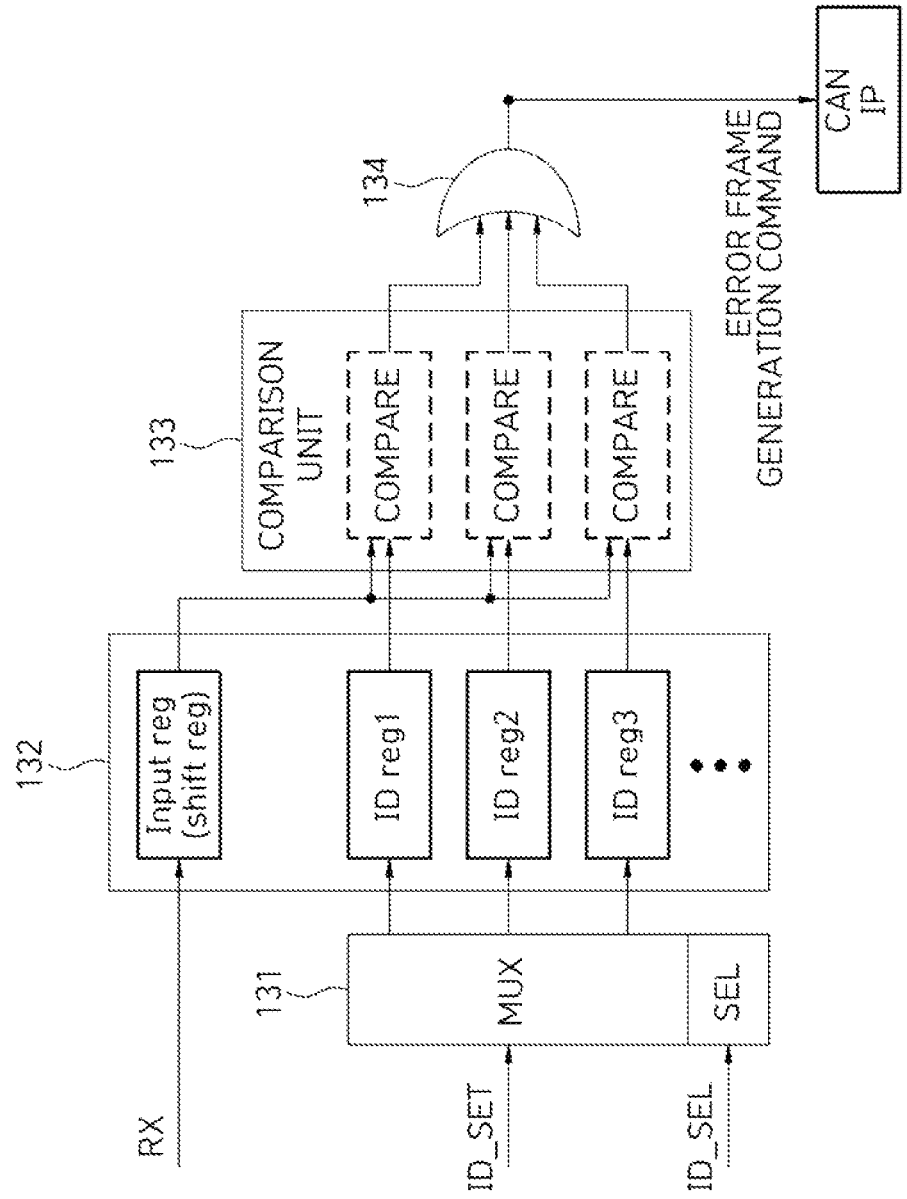
FIG. 5 is an exemplary diagram illustrating an error frame generation command.
Figure 6:
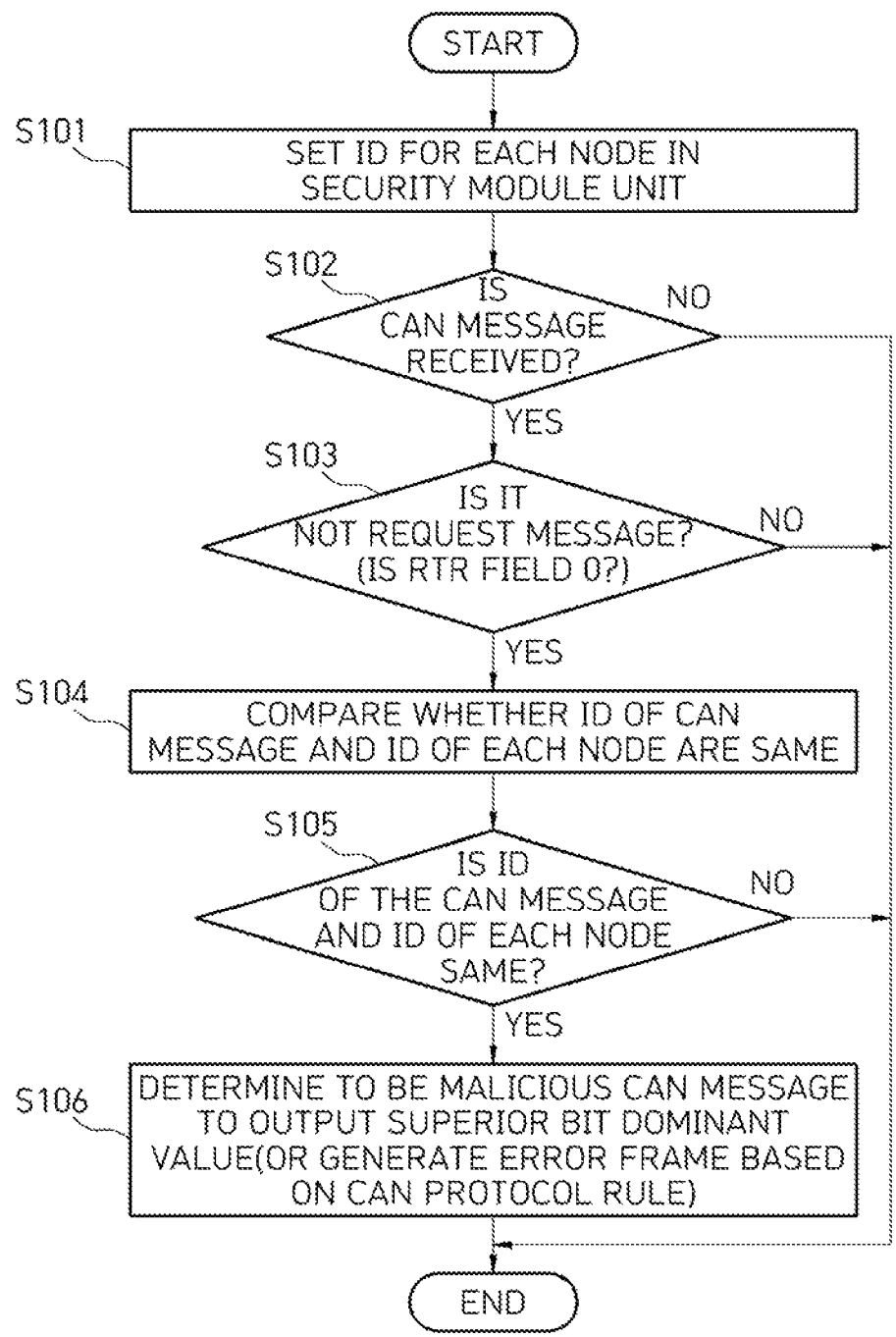
FIG. 6 is a flowchart for describing a method of security of vehicle CAN communication according to a first embodiment of the present invention.

Here, the permitted ID monitoring unit 400 and each node (for example, ECU 1, ECU 2, ECU 3, etc.) are implemented in the same network and have the same internal configuration (refer to FIGS. 3 and 4) but have a difference in an operation of the control unit 120 (see FIGS. 5 and 6).

FIG. 2A and FIG. 2B are exemplary diagrams illustrating a structure of a CAN message frame according to the CAN 2.0A standard in a general CAN communication method. As illustrated in FIG. 2, the CAN message frame structure includes a plurality of fields composed of the designated number of bits for each field.

FIG. 2A and FIG. 2B are exemplary diagrams illustrating a structure of a CAN message of the CAN 2.0A standard.

For example, a start of frame (SOF) field is composed of 1 bit, an identifier (ID) field is composed of 11 bits (or 29-bit extended ID), a remote transmission request (RTR) field is composed of 1 bit, a reserved bit R1 and a reserved bit R0 field are composed of 1 bit, a data length code (DLC) field is composed of 4 bits, a data bytes field is composed of 0 to 64 bits, an acknowledge (ACK) field is composed of 2 bits, an end of frame (EOF) field is composed of 7 bits, and an inter-frame space (IFS) of 7 bits includes the amount of time required by a controller and moves a correctly received frame to an appropriate location in a message buffer area.

In this case, what is important is that the CAN message output from each node (for example, ECU 1, ECU 2, ECU 3, etc.) has a unique ID, and vehicle control is performed using the information included in the CAN message including the unique ID. In addition, an ID field of CAN_flexible data rate (CAN_FD) message is also configured to be the same as the ID field of the CAN message.

Figure 3:
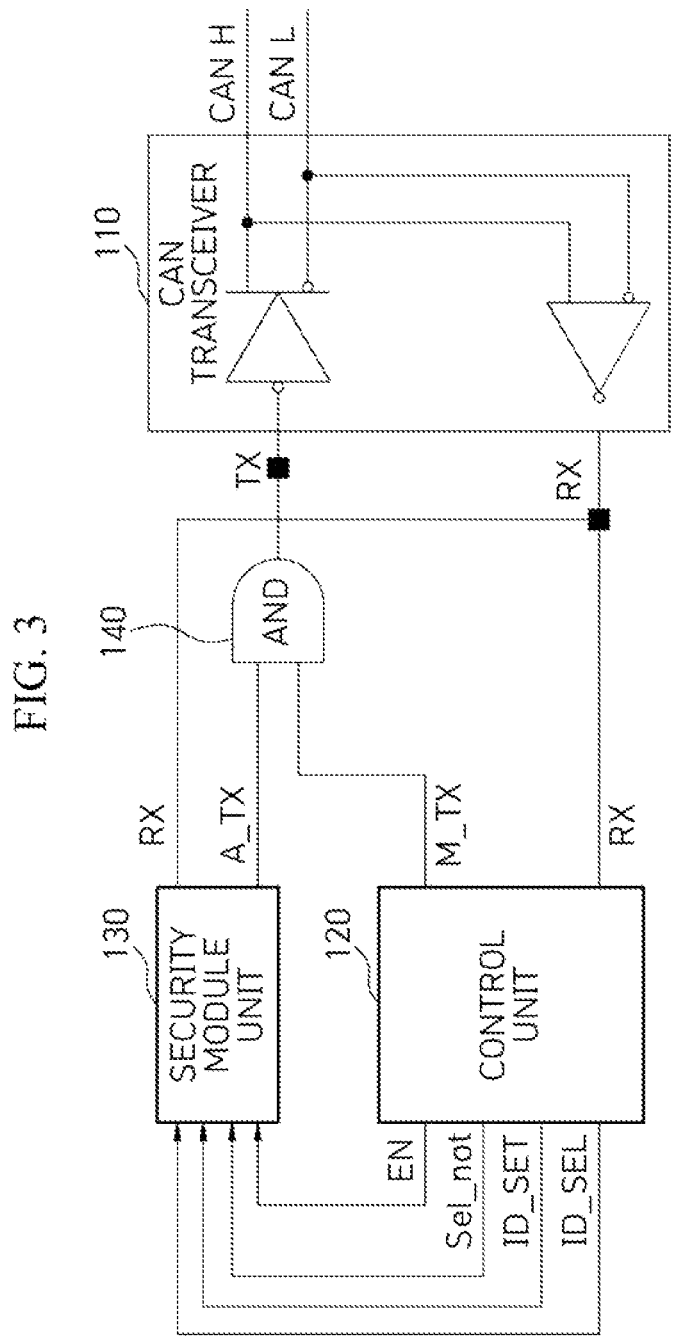
FIG. 3 is an exemplary diagram illustrating a schematic configuration of an apparatus for security of vehicle CAN communication according to an embodiment of the present invention.

FIG. 3 is an exemplary diagram illustrating a schematic configuration of an apparatus for security of vehicle CAN communication according to an embodiment of the present invention. In FIG. 1, a plurality of electronic control devices 100, 200, and 300 (or nodes) and the permitted ID monitoring unit 400 are implemented in the same internal configuration.

Therefore, in the present embodiment, for convenience of description, the internal configuration of one node 100 will be exemplarily described.

Referring to FIG. 3, the apparatus for security of vehicle CAN communication according to the present embodiment includes a CAN transceiver 110, a control unit 120, a security module unit 130, and an AND gate 140.

The CAN transceiver 110 transmits or receives CAN messages to or from each node.

For reference, one network includes a plurality of nodes (or ECUs) and a common CAN bus, and each node transmits a CAN message in a broadcasting manner and selects and receives the required CAN message.

The CAN transceiver 110 transmits or receives CAN messages through a CAN communication line.

In this case, the CAN transceiver 110 has an input terminal and an output terminal self-connected in common so that the control unit 120 of each node may receive the CAN message output from the control unit 120 of each node again to check whether an error has occurred.

The CAN transceiver 110 serves to convert the signal output from the control unit 120 into differential signals CAN H and CAN L to output the differential signals to the CAN bus and serves to change the differential signals CAN H and CAN L at a level that can be read by a microcontroller unit (MCU).

In this case, as illustrated in FIG. 1, when a CAN message with ID 100 is received from an external source (or external network) by hacking, a plurality of nodes (for example, ECU 1, ECU 2, ECU 3, etc.)) of the internal network connected by a common CAN bus regards the CAN message as a normal CAN message with ID 100 transmitted from the node (for example, ECU 1) of the internal network (i.e., erroneously recognizes a malicious CAN message as a normal CAN message), and thus, when data contained in the CAN message (that is, a malicious CAN message) with ID 100 received from the external source (or external network) is used, a vehicle malfunction may occur.

That is, when the ID of the CAN message received from the external source (or external network) is the CAN message including the same ID as the node ID (for example, ECU 1 with ID 100) of any one of the nodes (for example, ECU 1, ECU 2, and ECU 3, etc.) included in the internal network, the CAN message received from the external source (or external network) is the malicious CAN message, and therefore, it is necessary to quickly determine and block such a malicious CAN message.

However, in a method of determining whether the CAN message received from the external source (or external network) is the malicious CAN message, the determination may be made at a node (for example, ECU 1 with ID 100) having the same ID (for example, ECU 1 with ID 100) as the ID (for example, ID 100) of the CAN message received from the external source (or external network) among the nodes of the internal network. That is, although the node itself did not transmit the CAN message, only the node itself may know that the CAN message including the same ID as an ID thereof is received.

Accordingly, in the present embodiment, each node includes the security module unit 130, and the security module unit 130 included in each node monitors the ID of the CAN message received through the CAN transceiver 110 to determine the CAN message as a malicious CAN message when the CAN message with the same ID as a node ID thereof is received and blocks the malicious CAN message in real time (that is, before the entire CAN message frame is received, the security module unit 130 blocks the CAN message in real time as soon as the CAN message is determined to be the malicious CAN message during the reception of the CAN message).

The control unit 120 performs a general operation of recognizing the ID (identifier) of the CAN message, using the recognized ID to filter and receive a necessary message from among a plurality of CAN messages broadcast on the network, and using data included in the corresponding CAN message to control vehicles.

In addition, the control unit 120 controls the security module unit 130 to determine the malicious CAN message through ID monitoring of the CAN message.

For reference, according to a method of transmitting and receiving a CAN message used in general CAN communication, when the CAN message according to the CAN standard including ID, control, data, cyclic redundancy check (CRC), and the like is applied from a transmitting terminal (i.e., node transmitting a message) to an electrical wire (i.e., two twisted wires) as a square wave waveform, and is received by a receiving terminal (i.e., node receiving a message), it is acknowledged that the CAN message has been received by transmitting a 1-bit ACK signal to the transmitting terminal. In this case, any one of a plurality of nodes (for example, ECUs) connected in parallel in the network of the receiving terminal responds to the ACK signal. In addition, the transmitting terminal transmits the CAN message according to the CAN standard (that is, standard CAN protocol), changes to a receiving (RX) mode for a while in a designated period (i.e., for a designated period of time) in order to receive the ACK signal from the receiving terminal, and then transmits an end of frame (EOF).

In addition, the security module unit 130 may be implemented in the form of an application specific integrated circuit (ASIC) and monitors the ID of the CAN message transmitted/received through the CAN transceiver 110 under the control of the control unit 120.

The security module unit 130 determines the malicious CAN message (for example, a hacking message) through ID monitoring of the CAN message, and when it is determined that the received CAN message is a malicious CAN message, blocks the CAN message in advance before the entire CAN message is completely received. In this case, when the CAN message is determined to be the malicious CAN message, the security module unit 130 outputs superior data (for example, 0) to make the CAN transceiver superior, thereby preventing the received CAN message from being used.

According to the embodiment of the present invention, as illustrating in FIG. 5, when it is determined that the received CAN message is the malicious CAN message, the security module unit 130 does not transmit the superior data of 0 to the end of frame (EOF) but rather transmits an error frame according to the CAN communication rule. When it is determined that the received CAN message is the malicious CAN message, an error frame generation command is transmitted to CAN IP.

In this case, the security module unit 130 according to the present embodiment does not determine whether the CAN message is the malicious CAN message (for example, hacking message) after completely receiving the CAN message but rather determines whether the CAN message is the malicious CAN message (for example, hacking message) through the ID monitoring during the reception of the CAN message to cope with the hacking message in real time, thereby quickly coping with the hacking attack before damage due to the hacking attack occurs.

FIG. 4 is an exemplary view illustrating a more detailed configuration of the security module unit in FIG. 3. A method in which the control unit 120 controls the security module unit 130 to determine the malicious CAN message through the ID monitoring of the CAN message will be described with reference to FIGS. 3 and 4.

The security module unit 130 includes a multiplexer (MUX) unit 131, a register unit 132, a comparison unit 133, a first OR gate 134, a D flip-flop (D F/F) 135, an inversion selection unit 136, and a second OR gate 137.

Referring to FIG. 3, the control unit 120 (e.g., MCU) controls the security module unit 130 using four signals (for example, ID_SEL, ID_SET, Sel_not, and enable signal (EN)).

Here, the enable signal EN disables the security module unit 130 when the node itself transmits the CAN message, and enables the security module unit 130 only when the node itself receives the CAN message. That is, when the node itself transmits the CAN message, the security module unit 130 should not operate, and as a result, even when any signal is input to the OR gate by the enable signal EN, when the EN is 1, all of these signals are set to 1.

The security module unit 130 outputs an A_TX signal corresponding to whether the malicious CAN message is received through the ID monitoring of the CAN message, and outputs the A_TX to the CAN transceiver 110 through the AND gate 140.

When a vehicle is started, the control unit 120 uses the ID_SEL and ID_SET signals to store a unique ID of the security module unit 130 in the register unit 132 of the security module unit 130.

In this case, the ID of the node (for example, ECU 1, 100) is not necessarily set to only one, but may be set to be plural IDs.

Accordingly, the control unit 120 uses the ID_SEL signal to select one of the ID registers (for example, ID reg1, ID reg2, ID reg3, etc.), in which the ID of the security module unit 130 is stored, through the MUX unit 131, and then, sets the ID in any one of the selected ID registers using the ID_SET signal.

When the CAN message is received through the CAN transceiver 110, the control unit 120 stores field (for example, SOF, ID, and RTR) data designated in the CAN message in an input register (Input reg) of the register unit 132 of the security module unit 130.

The comparison unit 133 compares the ID of the CAN message stored in the input register (Input reg) with each of the IDs set in the ID registers (for example, ID reg1, ID reg2, ID reg3, etc.).

As a result of the above comparison, the fact that the ID stored in the input register (Input reg) and one of the IDs set in the ID registers (for example, ID reg1, ID reg2, ID reg3, etc.) are the same (that is, when the CAN message is not transmitted, but the CAN message with an ID thereof is received through the CAN transceiver) means that the CAN message received from the external source is the malicious CAN message generated by hacking the ID thereof.

In this case, it should be noted that when the RTR bit is 1, the CAN message is a message requesting information from the node from the external source, and therefore, is not determined to be the malicious CAN message. That is, only when the message is a CAN message, not a request message (that is, when the RTR bit of the CAN message is 0), it is determined whether the message is the malicious CAN message by comparing whether the same ID as the node's own ID is included in the CAN message.

When it is detected that any one of the IDs compared by the comparison unit 133 is the same (that is, when the ID stored in the input register (Input reg) and any one of the IDs set in the ID registers (for example, ID reg1, ID reg2, ID reg3, etc.) is the same), the first OR gate 134 outputs "1."

The output of the first OR gate 134 is input to the D flip-flop 135.

The D flip-flop 135 is used for the purpose of reducing a glitch according to the output of the first OR gate 134. The D flip-flop 135 sets whether the designated fields (for example, SOF, ID, RTR) of the CAN message end in "0, 1" (for example, set to be 1 in the designated field, and 0 when the designated field is the last field), which is used as the clock of the D flip-flop 135.

In addition, the D flip-flop 135 is reset when one message ends (that is, the EOF is detected in the CAN message).

When the received CAN message is determined to be the malicious CAN message, and thus, the currently received CAN message needs to be processed as an error (that is, block the currently received CAN message needs to be blocked), the inversion selection unit 136 inverts and outputs the output signal of the D flip-flop 135.

For example, when the received CAN message is the malicious CAN message (when the ID stored in the input register (Input reg) and any one of the IDs set in the ID registers (for example, ID reg1, ID reg2, ID reg3, etc.) are the same, the D flip-flop 135 outputs "1" which is inverted by the inversion selection unit 136 and output as "0."

Meanwhile, in the permitted ID monitoring unit 400, the inversion selection unit 136 operates differently from the inversion selection unit 136 in each node.

For example, in the permitted ID monitoring unit 400, the ID stored in the input register (Input reg) and any one of the IDs set in the ID registers (for example, ID reg1, ID reg2, ID reg3, etc.) (i.e., communication-permitted ID) are the same, the inversion selection unit 136 outputs without change, i.e., without inverting the output "1" of the D flip-flop 135.

However, when the ID stored in the input register and any one of the IDs set in the ID registers (for example, ID reg1, ID reg2, ID reg3, etc.) are the same, the CAN message corresponds to a malicious CAN message with a communication-non-permitted ID, so the inversion selection unit 136 outputs the output "0" of the D flip-flop 135 without change, i.e., without inverting the output "0" of the D flip-flop 135.

Accordingly, when "0" is output from the inversion selection unit 136, the second OR gate 137 outputs the output (for example, 0) of the inversion selection unit 136 as the A_TX signal. Referring to FIG. 3, the A_TX signal is ANDed with an output signal M_TX of the control unit 120 through the AND gate 140 and output to the CAN transceiver 110.

In this case, since a value output through the AND gate 140 is "0," "0" is input to the TX terminal of the CAN transceiver 110 regardless of the output signal of the control unit 120, and thus signals CAN H and CAN L output to a bus BUS of the CAN transceiver 110 are to output a superior bit dominant value. That is, the CAN message currently broadcast through the CAN bus becomes a meaningless CAN message.

As such, when the CAN message is determined to be the malicious CAN message through the ID monitoring of the CAN message received from the external source, the security module unit 130 implemented in each node forcibly outputs the superior bit to the CAN transceiver 110 immediately to cause an error in the CAN message, thereby preventing a data area of the malicious CAN message from being used.

In addition, in the present embodiment, the permitted ID monitoring unit 400 enables only the CAN message of the permitted ID to be received.

For example, as illustrated in FIG. 1, when it is assumed that a plurality of nodes (for example, ECU 1, ECU 2, ECU 3, etc.) are included in one network, and each unique ID (for example, ID 100, ID 200, and ID 300) is set in each node (for reference, a communication-permitted ID may be set as a node ID of an external network), in the case where a CAN message containing an ID (that is, a communication-non-permitted ID) other than an ID (for example, ID 100, ID 200, and ID 300) of a predefined node is input, the permitted ID monitoring unit 400 processes the CAN message as an error. That is, the signals CAN H and CAN L output to the bus BUS of the CAN transceiver 110 are to output the superior bit dominant value.

That is, when the CAN message with the permitted ID is received on the CAN bus, the permitted ID monitoring unit 400 outputs "1" from the security module unit 130 to make the CAN transceiver 110 inferior, and thus, enables normal communication. However, when none of the ID of the CAN message and the pre-registered communication-permitted ID are the same ID, the security module unit 130 outputs "0," and thus the signals CAN H and CAN L output to the bus BUS of the CAN transceiver are to output the superior bit dominant value.

FIG. 6 is a flowchart for describing a method of security of vehicle CAN communication according to a first embodiment of the present invention.

Referring to FIG. 6, the apparatus for security of vehicle CAN communication implemented in each node of the vehicle CAN communication network sets an ID thereof for each node in the security module unit 130 when a vehicle is started (S101).

When the CAN message (for example, a CAN message in which an RTR field is 0) is received through the CAN transceiver 110 (example of S102 and example of S103), the security module unit 130 compares whether the ID of the message and the IDs for each node are the same using the comparison unit 133 (S104).

According to the comparison result, when the ID of the CAN message and the IDs for each node are the same (example of S105), the security module unit 130 determines the CAN message as the malicious CAN message and outputs the superior bit dominant value from the CAN transceiver 110 (S106). According to another embodiment of the present invention, the security module unit 130 determines the CAN message as the malicious CAN message and transmits error frame generation command to CAN IP (S106).

Accordingly, since an error occurs in the currently received CAN message, the data area of the malicious CAN message cannot be used.

FIG. 7 is a flowchart for describing a method of security of vehicle CAN communication according to a second embodiment of the present invention. The permitted ID monitoring unit 400 is further included in the vehicle CAN communication network, and a method of improving security by allowing only reception of a CAN message with a communication-permitted node ID through a permitted ID monitoring unit 400 will be described.

Referring to FIG. 7, the apparatus for security of vehicle CAN communication implemented in each node of the vehicle CAN communication network sets (registers) all communication-permitted (communication-approved) node IDs in the security module unit 130 when the vehicle is started (S201).

When the CAN message (for example, a CAN message in which an RTR field is 0) is received through the CAN transceiver 110 (example of S202 and example of S203), the security module unit 130 compares whether the ID of the CAN message and any one of all the communication-permitted (communication-approved) node IDs are the same using the comparison unit 133 (S204).

According to the comparison result, when the ID of the CAN message and any one of the communication-permitted (communication-approved) node IDs are the same (example of S205), the security module unit 130 determines the CAN message as the malicious CAN message and outputs the superior bit dominant value from the CAN transceiver 110 (S206). According to another embodiment of the present invention, the security module unit 130 determines the CAN message as the malicious CAN message and transmits error frame generation command to CAN IP (S206).

Accordingly, since an error occurs in the currently received CAN message, the data area of the malicious CAN message cannot be used.

As described above, according to the present embodiment, when the node's own ID is included in the CAN message received from the node of the vehicle CAN network, it determines that the malicious CAN message is being received and the error processing of the CAN message is performed in real time. In addition, in the present embodiment, when the ID of the CAN message received from the node of the vehicle CAN network is not the pre-registered communication-permitted ID, it is determined that the malicious CAN message is being received, and thus, the error processing of the CAN message may be performed in real time. As described above, the present embodiment has the effect of ensuring integrity by blocking the entire CAN message in advance before the entire CAN message is completely received by the node.

Although the present invention has been described with reference to the exemplary embodiments shown in the accompanying drawings, this is only an example. It will be understood by those skilled in the art that various modifications and equivalent other exemplary embodiments are possible from the present invention. Therefore, the technical protection scope of the present invention should be defined by the following claims. In addition, implementations described in the present specification may also be implemented as, for example, a method or process, an apparatus, a software program, a data stream, or a signal. Although discussed only in the context of a single form of implementation (for example, discussed only as a method), implementations of the discussed features may also be implemented in other forms (for example, as an apparatus or a program). The apparatus may be implemented in suitable hardware, software and firmware, and the like. The method may be implemented in an apparatus such as a processor which generally refers to a computer, a microprocessor, an integrated circuit, or a processing device including a programmable logic device or the like. The processor also includes communication devices such as a computer, a cell phone, a portable/personal digital assistant ("PDA"), and other devices that facilitate communication of information between end-users.

According to an aspect of the present invention, it is possible to determine that a malicious CAN message is being received when an identifier (ID) of a node is included in the CAN message received from a vehicle CAN node to perform error processing on a controller area network (CAN) message in real time, and determine that a malicious CAN message is being received when an identifier of the CAN message received from a node of a vehicle CAN is not a pre-registered communication-permitted ID to perform error processing on a CAN message in real time. In this case, it is possible for the node to ensure integrity by blocking the entire CAN message before the entire CAN message is completely received.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for security of vehicle controller area network (CAN) communication, comprising:
    a security module unit included in each node of a vehicle CAN communication network and configured to monitor an identifier (ID) of each CAN message received through a CAN transceiver to determine whether the CAN message is a malicious CAN message to perform error processing; and
    a control unit configured to set an ID to be monitored by the security module unit and control the security module unit not to perform monitoring on the ID when the node transmits the CAN message,
    wherein the control unit is configured to disable the security module unit to not operate when the node itself uses an enable signal (EN) to transmit the CAN message, and is configured to enable the security module unit to operate only when the node itself receives the CAN message,
    wherein, based on a determination that the received CAN message is the malicious CAN message, the security module unit inputs superior data of 0 to a transmitting (TX) terminal of the CAN transceiver such that signals CAN H and CAN L, output to a bus of the CAN transceiver, are output with a superior bit dominant value,
    wherein the apparatus further comprises an AND gate connected to the transmitting (TX) terminal of the CAN transceiver, and
    wherein output signals of the security module unit and the control unit are combined through the AND gate to be output to the CAN transceiver.

2. The apparatus of claim 1, wherein, when a remote transmission request (RTR) field of the CAN message received through the CAN transceiver is 0 and the CAN message includes the same ID as an ID of the node itself, the security module unit determines that the CAN message is the malicious CAN message and perform error processing on the CAN message.

3. The apparatus of claim 1, wherein the security module unit is implemented in a form of an application specific integrated circuit (ASIC).

4. The apparatus of claim 1, wherein the control unit selects one of ID registers, in which an ID of the security module unit is stored, through an internal multiplexer (MUX) unit using an ID_SEL signal and sets the ID in any one of the selected ID registers using an ID_SET signal.

5. The apparatus of claim 1, wherein, when the CAN message is received through the CAN transceiver, the control unit stores data having a plurality of fields designated in the CAN message in an input register of a register unit of the security module unit, and
    a comparison unit compares the ID of the CAN message stored in the input register and each ID set in an ID register of the security module unit to determine that the received CAN message is the malicious CAN message when the ID stored in the input register is the same as the ID set in the ID register.

6. The apparatus of claim 5, wherein the plurality of designated fields are a start of frame (SOF) fie(Original) ld, an identifier (ID) field, and a remote transmission request (RTR) field.

7. The apparatus of claim 5, wherein the security module unit includes:
   a first OR gate configured to output an output value for the same ID detection result according to a comparison result of the comparison unit;
   a D flip-flop configured to receive a clock when it is determined whether the designated field of the CAN message is a last field;
   an inversion selection unit configured to invert an output signal of the D flip-flop to process a message determined to be the malicious CAN message as an error; and
   a second OR gate configured to output an output of the inversion selection unit as a signal corresponding to whether the malicious CAN message is received.

8. The apparatus of claim 1, further comprising a permitted ID monitoring unit configured to monitor the nodes of the vehicle CAN communication network so that only the CAN message with the communication-permitted ID is received through a CAN bus.

9. The apparatus of claim 8, wherein the permitted ID monitoring unit includes:
   a security module unit configured to store a plurality of communication-permitted IDs, and compare the ID of each CAN message received through the CAN transceiver with the plurality of IDs to determine that the CAN message with a communication-non-permitted ID is the malicious CAN message and perform the error processing; and
   a control unit configured to set a plurality of communication-permitted IDs to be monitored by the security module unit.

10. A method of security of vehicle controller area network (CAN) communication, comprising:
   setting an identifier (ID) to be monitored in a security module unit by a control unit included in each node of a vehicle CAN communication network;
   monitoring, by the security module unit, an ID of each CAN message received through a CAN transceiver;
   determining, by the security module unit, whether the received CAN message is a malicious CAN message through the ID monitoring; and
   when the received CAN message is the malicious CAN message, performing, by the security module unit, error processing on the received CAN message in real time,
   wherein, when a node is to transmit the CAN message, controlling, by the control unit, not to perform ID monitoring in the security module unit,
   wherein the control unit disables the security module unit to not operate when the node itself uses an enable signal EN to transmit the CAN message and enables the security module unit to operate only when the node itself receives the CAN message,
   wherein the performing of the error processing comprises, based on a determination that the received CAN message is the malicious CAN message, inputting, by the security module unit, superior data of 0 to a transmitting (TX) terminal of the CAN transceiver such that signals CAN H and CAN L, output to a bus of the CAN transceiver, are output with a superior bit dominant value,
   wherein output signals of the security module unit and the control unit are combined through an AND gate to be output to the CAN transceiver, and
   wherein based on the determination that the received CAN message is the malicious CAN message, the superior data of 0 is input, through the AND gate, to the transmitting (TX) terminal of the CAN transceiver.

11. The method of claim 10, wherein, in the determining of whether the received CAN message is the malicious CAN message, when a remote transmission request (RTR) field of the CAN message received through the CAN transceiver is 0 and the same ID as the ID of the node itself is included in the CAN message, the security module unit determines that the received CAN message is the malicious CAN message.

12. The method of claim 10, wherein, in the setting, by the control unit, of the ID to be monitored in the security module unit, the control unit selects one of ID registers, in which an ID of the security module unit is stored, through an internal multiplexer (MUX) unit using an ID_SEL signal and sets the ID of the node in any one of the selected ID registers using an ID_SET signal.

13. The method of claim 10, wherein the determining of whether the received CAN message is the malicious CAN message includes:
   when the CAN message is received through the CAN transceiver, storing, by the control unit, data having a plurality of fields designated in the CAN message in an input register of a register unit of the security module unit;
   comparing, by a comparison unit, an ID of the CAN message stored in the input register with an ID set in an ID register of the security module unit; and
   when the ID stored in the input register and the ID set in the ID register are the same, determining that the received CAN message is the malicious CAN message.

14. The method of claim 10, further comprising monitoring, by a permitted ID monitoring unit further included in nodes of the vehicle CAN communication network, the CAN message so that only a CAN message with a communication-permitted ID is received through a CAN bus.

15. The method of claim 14, wherein, in order to monitor the CAN message so that only the CAN message with the communication-permitted ID is received through the CAN bus, a plurality of communication-permitted IDs are stored in the security module unit of the permitted ID monitoring unit, and the security module unit compares IDs of CAN messages that are each received through the CAN transceiver with the plurality of IDs to determine the CAN message with a communication-non-permitted ID as a malicious CAN message and perform error processing on the CAN message, and
   the control unit sets the plurality of communication-permitted IDs to be monitored by the security module unit.

* * * * *